United States Patent
Tatamiya

(10) Patent No.: US 7,751,696 B2
(45) Date of Patent: Jul. 6, 2010

(54) CAMERA WITH WATERPROOF FUNCTION

(75) Inventor: Hisashi Tatamiya, Saitama (JP)

(73) Assignee: Hoya Corporation, Tokyo (JP)

( * ) Notice: Subject to any disclaimer, the term of this patent is extended or adjusted under 35 U.S.C. 154(b) by 1219 days.

(21) Appl. No.: 11/316,996

(22) Filed: Dec. 27, 2005

(65) Prior Publication Data

US 2006/0139443 A1 Jun. 29, 2006

(30) Foreign Application Priority Data

Dec. 28, 2004 (JP) ............................ P2004-378998

(51) Int. Cl.
*G03B 17/08* (2006.01)
(52) U.S. Cl. ........................................................ 396/25
(58) Field of Classification Search .............. 396/25–29
See application file for complete search history.

(56) References Cited

U.S. PATENT DOCUMENTS

| | | | |
|---|---|---|---|
| 4,194,041 A * | 3/1980 | Gore et al. .................. | 442/289 |
| 5,285,894 A | 2/1994 | Kamata et al. | |
| 5,374,970 A | 12/1994 | Satoh et al. | |
| 6,088,531 A | 7/2000 | Endoh | |
| 6,218,044 B1 | 4/2001 | Suzuka | |
| 2001/0005452 A1* | 6/2001 | Uchiyama et al. ............... | 396/6 |
| 2004/0029530 A1* | 2/2004 | Noguchi et al. ............... | 455/23 |
| 2005/0099511 A1* | 5/2005 | Cazier ...................... | 348/231.4 |
| 2005/0179813 A1* | 8/2005 | Fujii et al. .................. | 348/375 |
| 2005/0220448 A1* | 10/2005 | Tei et al. ........................ | 396/25 |

FOREIGN PATENT DOCUMENTS

| JP | 3-86338 | 8/1991 |
|---|---|---|
| JP | 3-89430 | 9/1991 |
| JP | 5-173240 | 7/1993 |
| JP | 5-188457 | 7/1993 |
| JP | 6-66191 | 9/1994 |
| JP | 8-116476 | 5/1996 |
| JP | 9-080608 | 3/1997 |
| JP | 10-294919 | 11/1998 |
| JP | 11-202396 | 7/1999 |
| JP | 2004-170579 | 6/2004 |
| JP | 3104217 | 7/2004 |

OTHER PUBLICATIONS

English Language Abstract of JP 9-080608.
English Language Abstract of JP 10-294919.
English Language Abstract of JP 11-202396.
English Language Abstract of JP 2004-170579.
English language Abstract of JP 8-116476, May 7, 1996.
English language Abstract of JP 5-188457, Jul. 30, 1993.
English language Abstract of JP 5-173240, Jul. 13, 1993.

* cited by examiner

*Primary Examiner*—Melissa J Koval
*Assistant Examiner*—Dennis Hancock
(74) *Attorney, Agent, or Firm*—Greenblum & Bernstein P.L.C.

(57) ABSTRACT

A camera according to the present invention has a housing that has a first hole and a second hole, a microphone, a loudspeaker, and a waterproof sheet that covers the microphone and the loudspeaker, and allows air-vibration to be transmitted. The microphone is arranged in the housing, in accordance with a position of the first hole. The loudspeaker is arranged in the housing, in accordance with a position of the second hole. The loudspeaker and the microphone are adjacent to each other, and the waterproof sheet is constructed as one-piece sheet.

12 Claims, 2 Drawing Sheets

CAMERA WITH WATERPROOF FUNCTION

BACKGROUND OF THE INVENTION

1. Field of the Invention

The present invention relates to a camera with a waterproof mechanism. Especially, it relates to a waterproof mechanism associated with a camera having a loudspeaker and a microphone.

2. Description of the Related Art

In a waterproof camera, packing such as an O-ring is placed around a cover member of a camera-housing or around a release button, to prevent the permeation of liquid such as water, into an inside of the housing, wherein a circuit board is installed. On the other hand, in the case of a camera with a loudspeaker and a microphone, a moisture permeable and breathable sheet, such as a Gore-Tex® sheet, is utilized so as to enable sounds or air-vibrations to be transmitted between the camera-outside and camera-inside. In the camera, the microphone and the loudspeaker are apart from each other, for example, the loudspeaker is arranged at the rear of the camera, whereas the microphone is arranged on an upper surface of the camera.

SUMMARY OF THE INVENTION

An object of the present invention is to provide a camera that has a simple construction without degrading the waterproof function.

A camera according to the present invention has a housing that has a first hole and a second hole, a microphone, a loudspeaker, and a waterproof sheet that covers the microphone and the loudspeaker, and allows air-vibrations to transmit into and out of the camera body. The microphone is arranged in the housing, in accordance with a position of the first hole. The loudspeaker is arranged in the housing, in accordance with a position of the second hole. The loudspeaker and the microphone are adjacent to each other, and the waterproof sheet is constructed as a one-piece sheet.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENTS

Hereinafter, the preferred embodiment of the present invention is described with reference to the attached drawings.

Figure 1:
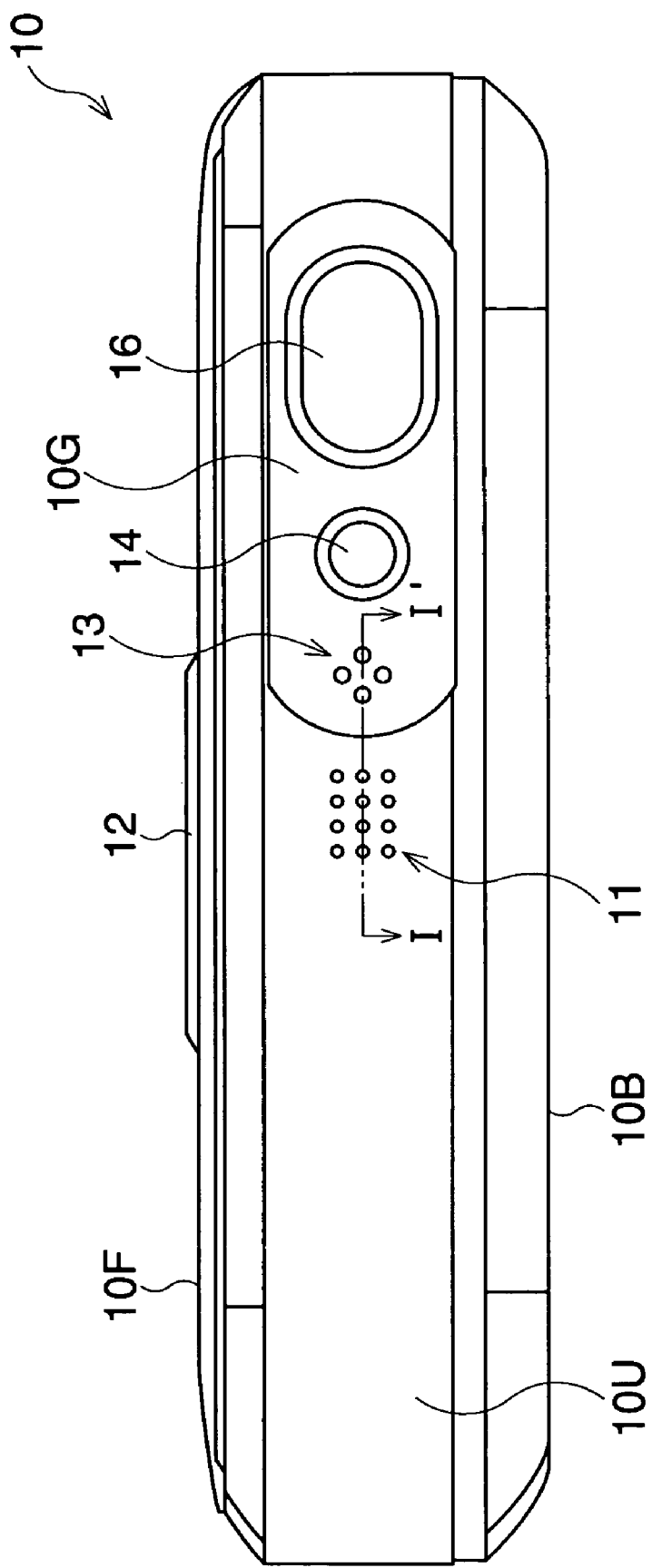
FIG. 1 is a schematic perspective view of a camera according to the present embodiment.

FIG. 1 is a schematic perspective view of a camera according to the present embodiment.

A camera 10 is a digital camera with a waterproof function, and is capable of recording sounds while photographing and replaying recorded sounds. A lens unit (not shown) is installed in the camera in accordance with a position of a ring 12 attached on a front surface 10F. A flat panel 10G is attached on the upper surface 10U, and a power button 14 and a release button 16 are provided on the flat panel 10G. Further, on the front surface 10U including the flat panel 10G, a plurality of holes 11 for a microphone (herein not shown) and a plurality of holes for a loudspeaker (herein not shown) are formed. An LCD monitor (not shown) is provided on a back surface 10B.

Figure 2:
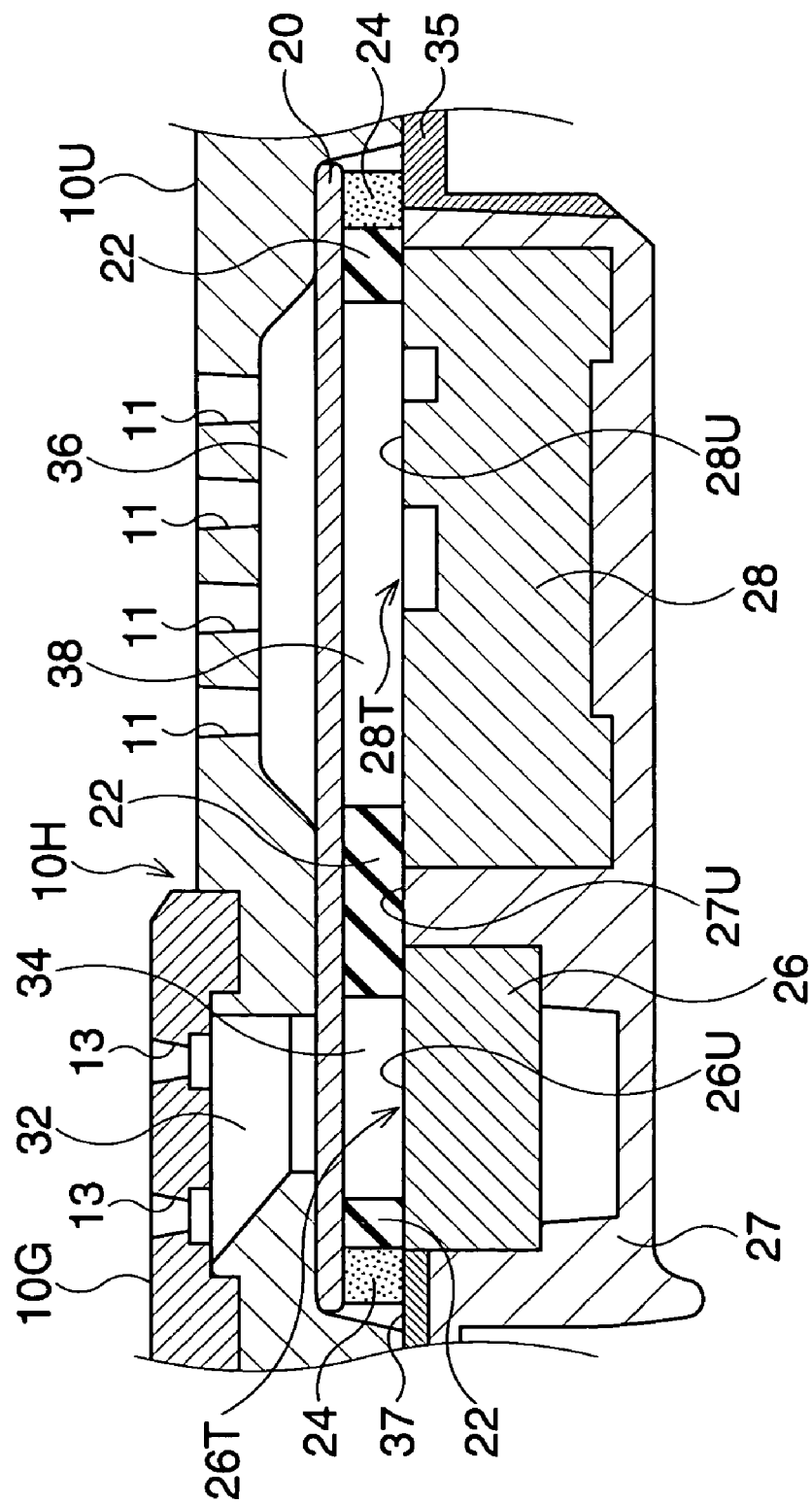
FIG. 2 is a section view along line I-I' shown in FIG. 1.

FIG. 2 is a section view along line I-I' shown in FIG. 1. In FIG. 2, a partial section portion adjacent to the upper surface 10U is represented.

The microphone 26 and the loudspeaker 28 are provided in a camera housing 10H, and are fixed in the housing 10H by a holder 27. The microphone 26 is arranged so as to be opposite to the holes 13, and the loudspeaker 28 is arranged so as to be opposite to the holes 11. The microphone 26 and the loudspeaker 28 are adjacent to each other, and are opposite on the same surface, namely, the upper surface 10U. An input portion 26T of the microphone 26 and an output portion 28T of the loudspeaker 28 are next to each other on the same surface, the upper surface 10U. A surface 26U of the microphone 26 and the surface 28U of the loudspeaker 28, and a surface 27U of the holder 27 form a surface in the housing 10H.

A waterproof sheet 20 and a rubber seal 22 are provided between the housing 10H and both the microphone 26 and the loudspeaker 28. The waterproof sheet 20 is supported by the rubber seal 22, which is put on the microphone 26, the loudspeaker 28, and the holder 27. The waterproof sheet 20 is capable of transmitting sounds or air vibrations from outside the camera 10 to the microphone 26, or from the loudspeaker 28 to the outside of the camera 10. Further, the waterproof sheet 20 has a property that prevents liquid permeation. The waterproof sheet 20 is herein a moisture permeable and breathable sheet such as a Gore-Tex® sheet, and the waterproof sheet 20 is constructed as a one-piece sheet.

The rubber seal 22 is provided to prevent degradation of the sound level due to the waterproof sheet 20. The rubber seal 22 is shaped like the numeral "8" seen from the upper side. Thus, an inner space 34 with a relatively small first radius and an inner space 38 with a relatively large second radius are provided between the waterproof sheet 20 and both the microphone 26 and the loudspeaker 28. The first and second radius are respectively defined in accordance with a size of the input portion 26T of the microphone 26 and a size of the output portion 28T of the loudspeaker 28.

An adhesive agent 24 is applied to the edge of the waterproof sheet 20 so as to fill up or seal up a gap between the waterproof sheet 20 and the supporting plates 35 and 37, which extend from the holder 27 along the upper surface 26U of the microphone 26 and the upper surface 28U of the loudspeaker. Thus, the waterproof sheet 20 is securely fixed on the holder 27, which prevents the permeation of water.

Above the waterproof sheet 20, an inner space 32 is formed below the holes 13, and an inner space 36 is formed below the holes 11 of the housing 10H. When recording sounds, sounds or air-vibrations transmit to the microphone 26 via the holes 13, the inner space 32, the waterproof sheet 20, and the inner space 34. On the other hand, when replaying the recorded sounds, sounds transmit to the outside of the camera 10 via the inner space 38, the waterproof sheet 20, the inner space 36, and the holes 11.

Circuits (not shown) for the microphone 28 and the loudspeaker 28, which are well known in the prior art, are installed in the camera 10. Note that, the input level of sounds is increased because of the waterproof sheet 20. A packing (not shown) such as an O-ring is arranged around a card slot (not shown), and a packing (not shown) such as rubber sheet is arranged around the release button 16.

In this way, in the present embodiment, the microphone 26 and the loudspeaker 28 are adjacent to each other, and the one piece of waterproof sheet 20 is provided between the housing 10H and both the microphone 26 and the loudspeaker 28.

Since the sheet 20 is constructed as one-piece sheet, the water-proof testing of the loudspeaker 28 and the microphone 26 can be carried out simultaneously after applying the sheet the inside of the camera 20 by the adhesive agent 24. This results in ease of the manufacturing and the inspection.

A mesh-shaped sheet may be applied instead of the moisture permeable and breathable sheet. Any waterproof sheet constructed as a one-piece sheet is acceptable. The microphone 26 and the loudspeaker 28 may be arranged on the back surface or a side surface of the camera 10. The distance between the microphone 26 and the loudspeaker 28 maybe defined such that a one-piece waterproof sheet can cover the microphone 26 and the loudspeaker 28.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2004-378998 (filed on Dec. 28, 2004), which is expressly incorporated herein, by reference, in its entirety.

The invention claimed is:

1. A camera, comprising:
   a housing that has a first hole and a second hole;
   a microphone configured to be arranged in said housing at a position corresponding to a location of said first hole;
   a loudspeaker configured to be arranged in said housing at a position corresponding to a location of said second hole, said loudspeaker and said microphone being adjacent to each other;
   a holder that fixes said microphone and said loudspeaker;
   a single waterproof sheet that covers said microphone and said loudspeaker, and transmits air-vibrations; and
   a unitary support member positioned between said waterproof sheet and both said microphone and loudspeaker,
   wherein said support member is position on each of said microphone, said loudspeaker, and said holder, and
   wherein said support member supports said waterproof sheet so as to define a first inner space between said waterproof sheet and an input of said microphone and a second inner space between said waterproof sheet and an output of said loudspeaker.

2. The camera of claim 1, wherein said first and second holes are formed on a same surface of said camera.

3. The camera of claim 1, wherein said first and second holes are formed on an upper surface of said camera.

4. The camera of claim 1, wherein said waterproof sheet comprises a moisture permeable and breathable sheet.

5. The camera of claim 1, wherein said support member has a numeral "8" shape in a plain view.

6. The camera of claim 1, wherein said support member comprises a rubber seal.

7. A waterproof mechanism, comprising:
   a housing that has a first hole and a second hole;
   a single waterproof sheet that covers a microphone configured to be arranged in said housing at a position corresponding to a location of said first hole and covers a loudspeaker configured to be arranged in said housing at a position corresponding to a location of said second hole, said waterproof sheet transmitting air-vibrations,
   wherein said loudspeaker and said microphone are adjacent to each other;
   a holder that fixes said microphone an said loudspeaker; and
   a unitary support member positioned between said waterproof sheet and both said microphone and loudspeaker,
   wherein said support member is position on each of said microphone, said loudspeaker, and said holder, and
   wherein said support member supports said waterproof sheet so as to define a first inner space between said waterproof sheet and an input of said microphone and a second inner space between said waterproof sheet and output of said loudspeaker.

8. The waterproofing of mechanism of claim 7, wherein said first and second holes are formed on a same surface of said housing.

9. The waterproofing of mechanism of claim 7, wherein said first and second holes are formed on an upper surface of said housing.

10. The waterproofing of mechanism of claim 7, wherein said waterproof sheet comprises a moisture permeable and breathable sheet.

11. The waterproof mechanism of claim 7, wherein said support member has a numeral "8" shape in a plan view.

12. The waterproof mechanism of claim 7, wherein said support member comprises a rubber seal.

* * * * *